(12) United States Patent
Meerman

(10) Patent No.: US 7,070,863 B2
(45) Date of Patent: Jul. 4, 2006

(54) GLAZING

(75) Inventor: Christophe Meerman, Jumet (BE)

(73) Assignee: Glaverbel, Brussels (BE)

( * ) Notice: Subject to any disclaimer, the term of this patent is extended or adjusted under 35 U.S.C. 154(b) by 137 days.

(21) Appl. No.: 10/333,123

(22) PCT Filed: Jul. 18, 2001

(86) PCT No.: PCT/EP01/08335

§ 371 (c)(1),
(2), (4) Date: Jan. 16, 2003

(87) PCT Pub. No.: WO02/07967

PCT Pub. Date: Jan. 31, 2002

(65) Prior Publication Data

US 2004/0098946 A1    May 27, 2004

(30) Foreign Application Priority Data

Jul. 20, 2000    (EP) .................................. 00202586

(51) Int. Cl.
    *B32B 17/06* (2006.01)
(52) U.S. Cl. ...................................... 428/428; 428/432
(58) Field of Classification Search ................ 428/428, 428/432; 65/104, 106, 114, 115
    See application file for complete search history.

(56) References Cited

U.S. PATENT DOCUMENTS

| 4,035,576 A | 7/1977 | Henry |
| 4,555,607 A | 11/1985 | Roentgen et al. |
| 4,610,771 A | 9/1986 | Gillery |
| 5,300,349 A | 4/1994 | Roche et al. |
| 5,397,647 A * | 3/1995 | Kramling et al. ........... 428/426 |
| 5,821,001 A | 10/1998 | Arbab et al. |
| 5,942,338 A | 8/1999 | Arbab et al. |
| 6,562,490 B1 | 5/2003 | Ebisawa et al. |

FOREIGN PATENT DOCUMENTS

| EP | 0022727 A2 | 1/1981 |
| EP | GB2157754 A | 10/1985 |
| EP | 0236045 A2 | 9/1987 |
| EP | 0478405 A1 | 3/1993 |
| EP | GB2280925 A | 2/1995 |
| EP | 0526263 A1 | 3/1995 |
| EP | 0803481 A2 | 10/1997 |
| EP | 0887180 A2 | 12/1998 |
| EP | WO 99/58736 | 11/1999 |

* cited by examiner

Primary Examiner—Jennifer McNeil
Assistant Examiner—G. Blackwell
(74) Attorney, Agent, or Firm—Akerman Senterfitt; Jerold I. Schneider

(57) ABSTRACT

A laminated glazing panel (10) has at least one sheet of glass having a thickness of between 0.8 mm and 3.5 mm. The glass sheet has: a) an edge compression stress of between 20 MPa and 90 MPa; and b) a surface compressive stress at a central portion of the glass of between 2 MPa and 39 MPa. The glazing panel may be used as a laminated automotive glazing. A method of manufacturing a laminated glazing panel is also disclosed, comprising individually bending two sheets of glass and subsequently assembling and laminating the two sheets of glass together.

19 Claims, 1 Drawing Sheet

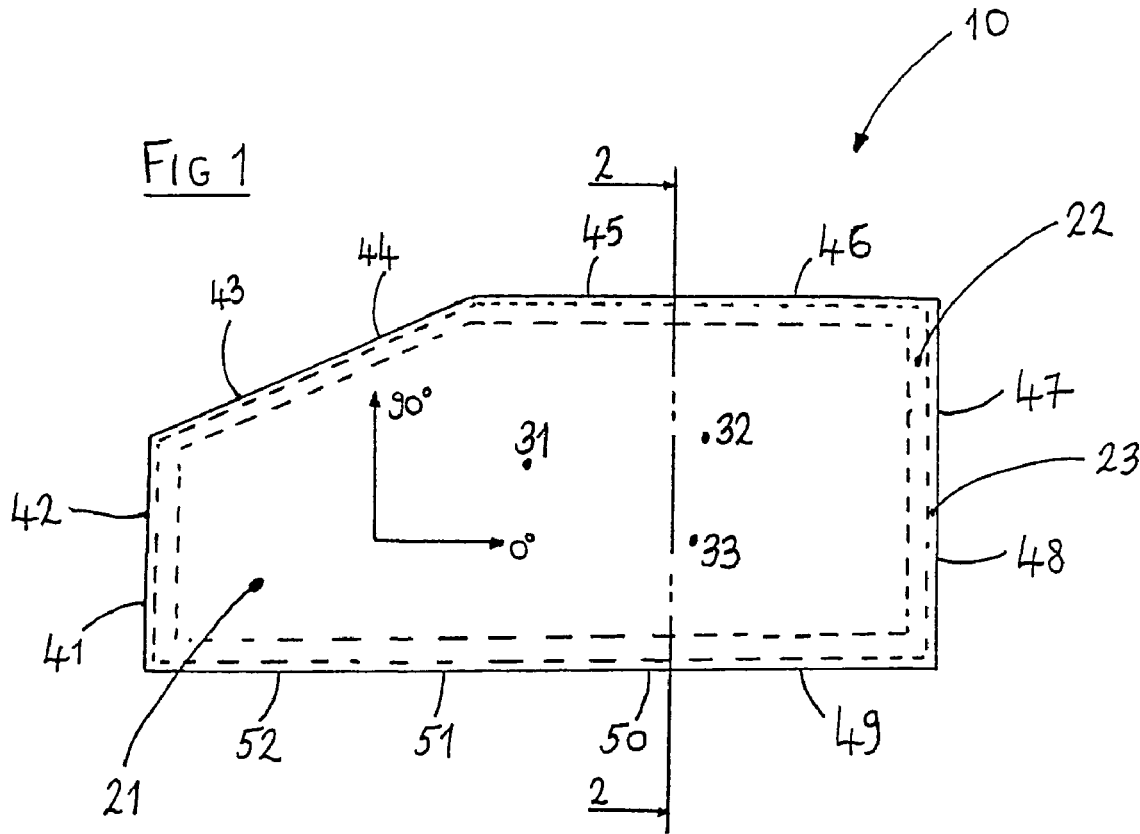
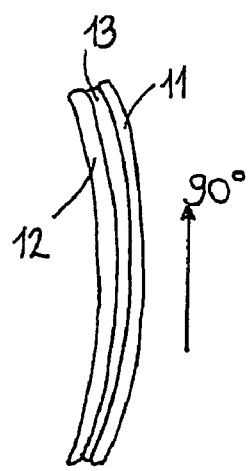

GLAZING

CROSS REFERENCE TO RELATED APPLICATIONS

This application is the U.S. National Stage of International Application No. PCT/EP01/08335 filed 18 Jul. 2001, and claims the priority of European Application No. 00202586.4 filed 20 Jul. 2000. The entirety of each of those applications is incorporated herein by reference.

BACKGROUND OF THE INVENTION

This invention relates to glazing panels and particularly but not exclusively to laminated glazing panels intended for automotive side windows and rear windows.

Whilst the invention will be described with particular reference to laminated automotive side windows it may also be used in other applications, for example vehicle windscreens, vehicle backlights, vehicle sunroofs, other vehicle glazing panels and other laminated glazings.

Car sidelights have traditionally be provided as monolithic thermally tempered glass sheets having a thickness of between about 3 mm and 5 mm. The tempering is arranged to increase the mechanical resistance of the glass sheets and to ensure that if the glass sheets shatters it breaks into relatively small, blunt edged pieces so as to minimise potential injury.

It is also known to provide laminated glass sidelights having two sheets of glass laminated together by means of a sheet of polyvinyl butyral (pvb). It has always been considered that the glass sheets in such a structure must be tempered or at least hardened so as to induce a significant level of surface stress in order to provide sufficient mechanical resistance for handling and use and, for example, to withstand repeated slamming of a car door in which the glazing is mounted. The individual sheets of glass in such a structure generally have a thickness of less than 3 mm so as to minimise their weight and it has been difficult or impossible to induce the desired stresses in such thin glass sheets by many conventional manufacturing techniques.

Laminated sidelights comprising a single sheet of glass laminated with a single sheet of plastics, for example a polyurethane, have also been proposed. In addition to the durability and abrasion considerations for such glazings, the difficulty of providing the tempered characteristics perceived necessary with relatively thin sheets of glass has also been problematic.

SUMMARY OF THE INVENTION

According to a first aspect, the present invention provides a laminated glazing panel.

It had previously been thought necessary to have significantly higher levels of surface compressive stress for such glazing panels in order to provide desired mechanical characteristics. It is also surprising that relatively low levels of surface compressive stress may be successfully combined with edge compressive stresses which are relatively high. The value of the edge compressive stress may be greater than the value of the surface compressive stress.

Particularly in the case of a curved sheet of glass, the defined level of surface compressive stress is preferably the stress at 90° i.e. perpendicular to the longitudinal axis of the glass sheet or perpendicular to the main axis about which the glass sheet is curved. The defined level of stress may be present at the concave surface of a curved sheet of glass and/or at the convex surface. The required levels of surface compressive stress may be satisfied if the majority of the points in question fall within the defined levels of stress.

The edge compressive stresses defined are preferably the maximum stresses at the edges of the glazing panel and may ensure that the glazing is not overly susceptible to breakage at its edges, for example during handling and/or use. The levels of edge compressive stress defined may be satisfied if the majority of points at the peripheral edge of the glazing fall within the defined limits. Clearly, it is more important that the edges of the glazing panel which are going to be exposed in use, for example the top edge of a vertically moveable car door window, conform to the edge stress requirements of the present invention rather than edges that will be less susceptible in use either to flexion or impact, for example, the lower edge of a vertically sliding car door window which in use is always hidden within the car door.

The surface compressive stress at a central portion of the glass may be greater than or equal to 5 MPa, 10 MPa or 15 MPa; it is preferably greater than or equal to 20 MPa.

Arranging for the edge compressive stress of the glass to have a value of greater than or equal to about 30 MPa and/or less than or equal to about 65 MPa may provide an advantageous level of edge compressive stress to confer desired mechanical characteristics and/or may be obtainable with certain manufacturing techniques.

The laminating layer may be a sheet of polyvinalbutyral (PVB) having a thickness of between about 0.2 mm and 1.6 mm. Standard PVB thicknesses for laminated car glazing panels are 0.38 mm and 0.76 mm. The laminating layer may be a composite layer; it may comprises, for example, two sheets of PVB having another layer, for example a sheet of polyethylene terephtalate (PET) sandwiched between them. Such a PET (or other sheet) may carry a solar control coating, for example a magnetron sputtered coating stack adapted to enhance the solar control properties of the glazing.

According to a second aspect, the present invention provides a laminated glazing panel.

It is particularly surprising that glass sheets having edge stresses within the defined range are suitable for the purposes envisaged.

The glass sheet may have an edge compression stress of greater than about 30 MPa, 40 MPa or 45 MPa; however, ranges of 20 MPa to 80 MPa and 20 MPa to 90 MPa are also appropriate.

The surface compressive stress of the glass sheet at a central portion of the glass may be greater than 5 MPa, preferably greater than 20 MPa; it may be less than 60 MPa or less than 40 MPa.

Arranging the intermediate portion of the glazing to have a tensile stress averaged across the thickness of the glass of between about 0 MPa and 15 MPa may reduce the fragility of this portion of the glazing and reduce its susceptibility to breaking upon impact. In fact, it is almost inevitable for a heat treated glass to have an intermediate zone which averaged across the thickness of the glass is in tension. The intermediate zone may have a tensile stress averaged across its thickness of greater than 2 MPa, 4 MPa or 5 MPa and/or less than 10 MPa or 12 MPa.

The use of one or more glass sheets having a thickness of between about 1.2 mm and 2.5 mm may facilitate reduction in the overall weight of the laminated glazing panel and/or allow a desired overall thickness of laminated glazing panel to be produced. This may be particularly useful for automotive applications. For example, two sheets of glass each having a thickness of 1.65 mm may be laminated together by a 0.76 mm thick layer of pvb to give an overall thickness of 4.06 mm. This may be interchanged with a monolithic glazing panel having a nominal thickness of 4 mm. It may be possible to use a glazing panel having a thickness of up to about 4.4 mm in a sliding arrangement designed for a nominal thickness of 4 mm.

Where the laminated glazing panel has two sheets of glass, each of these two sheets may have the defined levels of stress. This may confer suitable properties on the laminated glazing panel; it may also facilitate manufacture by allowing two similar or substantially identical glass sheets to be assembled together to form the, laminated glazing panel rather than requiring different manufacturing operation for each of the two glass sheets. In this case, the two glass sheets preferably have substantially the same thickness; alternatively, the two glass sheets may have different thicknesses. The two glass sheets may be bent individually, for example by pressing, rather than being bent as a pair.

The present invention may permit the use of certain types of conventional furnaces and/or manufacturing techniques that could not readily be used for prior art glazings.

The laminated glazing panel may be curved or substantially non-planar. In this case, the desired stresses are preferably induced as part of an operation or process by which the glass is bent or shaped.

Preferably, the surface stress characteristics are substantially similar over the entire surface of the glass, or over the majority of the surface of the glass or over the majority of the central portion of the glass. This may confer substantially similar breaking characteristics over all of or at least over the majority of the surface of the sheet of glass. Clearly, the breaking characteristic at any edge portion and at any intermediate portion are unlikely to be identical to that at the central portion. Nevertheless, the surface stress characteristics may be substantially uniform in the sense that the glass preferably does not have differentiated stress zones.

The glass of the glazing panel is preferably a soda-lime glass, more preferably float glass. It may comprise the following constituent (expressed in percentage by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

According to further aspects, the present invention provides for a laminated glazing and for a method of manufacturing a laminated glazing.

BRIEF DESCRIPTION OF THE DRAWINGS

An embodiment of the present invention will now be described, by way of example only, with reference to the accompanying drawings of which:

FIG. 1 is a plan view of a laminated glazing panel; and

FIG. 2 is a cross section through line 2—2 of FIG. 1.

For ease of representation, the figures are not drawn to scale.

DETAILED DESCRIPTION

The accompanying drawings show a laminated glazing panel which forms a moveable side window of a car. The glazing 10 comprises first 11 and second 12 sheets of glass laminated together by means of a substantially transparent pvb laminating layer. It may be manufactured by cutting the desired peripheral shape of each sheet of glass from a flat, planar glass sheet to provide a blank, passing the blank through a furnace to raise its temperature sufficiently to allow it to be bent, pressing the heated blank against a convex mould to curve the blank, allowing the curved blank to cool and subsequently assembling and laminating it with a second similarly produced blank to produce a laminated glazing panel. Alternatively, a method of bending by gravity rather than by pressing may be used.

In the illustrated example, each of the glass sheets 11,12 has a thickness of 1.7 mm and has a similar stress distribution.

As indicated by the dotted lines in FIG. 1, the glass sheet may be considered to have three distinct stress zone, being:

a) a central zone 21 at which the core of the glass sheet is subject to tensile stresses and at which the surfaces of the glass sheet are subjected to compressive stresses and at which the total stress averaged across the thickness of the glazing is substantially zero;

b) an intermediate zone 22 at which the core of the glass sheet is subject to tensile stresses and at which the surfaces of the glass sheet are subjected to compressive stresses and at which the total stress averaged across the thickness of the glazing is a tensile stress; and c) an edge region 23 at which the total stresses averaged across thickness of the glass sheet are compressive stresses.

The exact boundary between the different stress zones may not be clearly discernible.

In general, the edge region will have a width of between about two to three times the thickness of the glass from the peripheral edge of the glass sheet and the intermediate region will have a width of up to about ten times the thickness of the glass.

Table 1 sets out the surface stress at three point in the central region at the convex side of one of the sheets of glass:

TABLE 1

| Position | Surface compression at 90° |
|---|---|
| 31 | 24.2 MPa |
| 32 | 22.8 MPa |
| 33 | 22.3 MPa |

The surface compression is measured using a Gasp measuring device from Strainoptic Inc. which is placed so as to direct its laser beam along the axis at 0° and consequently measure the surface compression at 90°. Where the glass is a float glass, it is preferable to measure the surface compressive stress of the tin face, i.e. the face of the glass that has been in contact with the tin float bath during its manufacture.

The surface compression at the central zone 21 of the glass may be non-homogeneous i.e. it may vary as a function of the direction in which it is measured.

Table 2 sets out the maximum tensile stress averaged across the thickness of the glass at positions of the intermediate region corresponding to the positions indicated at the periphery of the glazing panel:

TABLE 2

| Position | Tensile stress |
| --- | --- |
| 41 | 1.1 MPa |
| 42 | 4.4 MPa |
| 43 | 7.8 MPa |
| 44 | 5.6 MPa |
| 45 | 1.1 MPa |
| 46 | 3.3 MPa |
| 47 | 2.1 MPa |
| 48 | 4.2 MPa |
| 49 | 7.1 MPa |
| 50 | 7.8 MPa |
| 51 | 5.6 MPa |
| 52 | 3.3 MPa |

The tensile stress is measured using an optical measurement technique with the help of a Babinet comparator.

Table 3 sets out the maximum compressive stress measured at twelve points of the edge region around the periphery of the glazing panel:

TABLE 3

| Position | Compressive edge stress |
| --- | --- |
| 41 | 45.2 MPa |
| 42 | 44.0 MPa |
| 43 | 42.7 MPa |
| 44 | 44.0 MPa |
| 45 | 47.6 MPa |
| 46 | 51.3 MPa |
| 47 | 48.8 MPa |
| 48 | 41.5 MPa |
| 49 | 47.6 MPa |
| 50 | 48.8 MPa |
| 51 | 50.1 MPa |
| 52 | 42.7 MPa |

The compressive edge stress is measured using an optical measurement technique with the help of a Babinet comparator.

Preferably, glazings according to the invention conform to European standard R43.

The present invention may permit a single furnace to be used to manufacture both monolithic tempered glazing panels and laminated glazing panels in accordance with the invention. Suitable adjustments may be made to the furnace conditions and to the manufacturing process to enable this.

The invention claimed is:

1. A laminated glazing panel comprising at least one sheet of glass having a thickness of between 0.8 mm and 1.7 mm characterised in that glass sheet has:
   a) an edge compression stress of between 20 MPa and 80 MPa; and
   b) a surface compressive stress at a central portion of the glass of between 5 MPa and 60 MPa, the edge compression stress being greater than the surface compressive stress.

2. A laminated glazing panel in accordance with claim 1, in which at an intermediate portion of the glass sheet positioned between the central portion and the portion having the defined edge compressive stress, the glass sheet has a tensile stress averaged across the thickness of the glass sheet of more than 0 MPa and less than 15 MPa.

3. A laminated glazing panel in accordance with claim 1, in which the glass sheet has a thickness of between 1.1 mm and 1.7 mm.

4. A laminated glazing panel in accordance with claim 1, in which the glazing panel comprises two sheets of glass laminated together by means of a substantially transparent interlayer.

5. A laminated glazing panel in accordance with claim 1, in which the glazing panel is an automotive side window or an automotive rear window.

6. A method of manufacturing a laminated glazing panel in accordance with claim 1 which comprises two sheets of glass in which each sheet of glass is bent individually to confer upon it a desired curvature and in which the two sheets are subsequently assembled together and laminated together to form the laminated glazing panel.

7. A laminated glazing panel comprising at least one sheet of glass having a thickness of between 0.8 mm and 1.65 mm, characterised in that the glass sheet has:
   a) an edge compression stress of between 20 MPa and 80 MPa; and
   b) a surface compressive stress at a central portion of the glass of between 5 MPa and 60 MPa, the edge compression stress being greater than the surface compressive stress.

8. A laminated glazing panel in accordance with claim 7, in which at an intermediate portion of the glass sheet positioned between the central portion and the portion having the defined edge compressive stress, the glass sheet has a tensile stress averaged across the thickness of the glass sheet of more than 0 MPa and less than 15 MPa.

9. A laminated glazing panel in accordance with claim 7, in which the glass sheet has a thickness of between 1.1 mm and 1.7 mm.

10. A laminated glazing panel in accordance with claim 7, in which the glazing panel comprises two sheets of glass laminated together by means of a substantially transparent interlayer.

11. A laminated glazing panel in accordance with claim 7, in which the glazing panel is an automotive side window or an automotive rear window.

12. A method of manufacturing a laminated glazing panel in accordance with claim 7 which comprises two sheets of glass in which each sheet of glass is bent individually to confer upon it a desired curvature and in which the two sheets are subsequently assembled together and laminated together to form the laminated glazing panel.

13. A glass sheet adapted to be assembled as a laminated glazing panel comprising at least one sheet of glass having a thickness of between 0.8 mm and 1.7 mm characterized in that the glass sheet has:
   a) an edge compression stress of between 20 MPa and 90 MPa; and
   b) a surface compressive stress at a central portion of the glass of between 5 MPa and 60 MPa, the edge compression stress being greater than the surface compressive stress.

14. A laminated glazing panel comprising two glass sheets in accordance with claim 13.

15. A laminated automotive side window or rear window in accordance with claim 14.

16. A method of manufacturing a laminated glazing panel in accordance with claim 13 which comprises two sheets of glass in which each sheet of glass is bent individually to confer upon it a desired curvature and in which the two sheets are subsequently assembled together and laminated together to form the laminated glazing panel.

17. A laminated glazing panel comprising only two glass sheets, the sheets made in accordance with claim 16.

18. A laminated automotive side window or rear window in accordance with claim 7.

19. A meted of manufacturing a laminated glazing panel in accordance with claim 1 which comprises two sheets of glass in which each sheet of glass is bent individually to confer upon it a desired curvature and in which the two sheets are subsequently assembled together and laminated together to form the laminated glazing panel.

* * * * *